US006996821B1

(12) United States Patent
Butterworth

(10) Patent No.: US 6,996,821 B1
(45) Date of Patent: Feb. 7, 2006

(54) DATA PROCESSING SYSTEMS AND METHOD FOR BATCHING TASKS OF THE SAME TYPE IN AN INSTRUCTION CACHE

(75) Inventor: Henry Esmond Butterworth, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/338,035

(22) Filed: Jun. 22, 1999

(30) Foreign Application Priority Data

Mar. 25, 1999 (GB) .................................... 9906792

(51) Int. Cl.
*G06F 9/46* (2006.01)
*G06F 12/00* (2006.01)

(52) U.S. Cl. ...................... 718/100; 711/100; 711/125
(58) Field of Classification Search ................ 709/201, 709/100–108, 200; 718/1–108; 711/100, 711/125
See application file for complete search history.

(56) References Cited

U.S. PATENT DOCUMENTS

| | | | | |
|---|---|---|---|---|
| 5,381,546 A | * | 1/1995 | Servi et al. .................. 709/102 |
| 5,668,993 A | * | 9/1997 | Peters et al. ................ 709/101 |
| 5,727,211 A | * | 3/1998 | Gulsen ........................ 709/108 |
| 5,745,778 A | * | 4/1998 | Alfieri ............................ 712/1 |
| 5,778,434 A | * | 7/1998 | Nguyen et al. ............. 711/137 |
| 5,835,763 A | * | 11/1998 | Klein ......................... 709/101 |
| 5,875,464 A | * | 2/1999 | Kirk ........................... 711/121 |
| 6,128,703 A | * | 10/2000 | Bourekas et al. ........... 711/118 |
| 6,269,391 B1 | * | 7/2001 | Gillespie .................... 718/100 |
| 6,332,167 B1 | * | 12/2001 | Peters et al. ................ 709/318 |
| 6,438,573 B1 | * | 8/2002 | Nilsen ........................ 709/100 |

FOREIGN PATENT DOCUMENTS

| EP | 0132381 | 1/1985 |
|---|---|---|
| EP | 0644484 | 3/1995 |

* cited by examiner

*Primary Examiner*—Meng-Al T. An
*Assistant Examiner*—Kenneth Tang
(74) *Attorney, Agent, or Firm*—Ido Tuchman

(57) ABSTRACT

Described is a method and apparatus for processing tasks in a data processing system including a microprocessor and an instruction cache. Tasks of different types are defined in the system with each task type having code associated therewith. The tasks are managed in a queue and are processed in order by loading the associated code into the instruction cache for execution on the microprocessor. The method comprises the steps of scheduling tasks of like type into a batch such that tasks in a batch are processed before processing the next ordered task. In the case where the code associated with a batched task fits within the instruction cache, the tasks in a batch can be processed without incurring the penalty associated with instruction cache misses.

13 Claims, 4 Drawing Sheets

If the task is not capable of fully loading into the instruction cache, logically dividing the task code such that least one atomic portion of the task code will fully load in the instruction cache Executing the task code for processing the new task in the instruction cache without loading new code into the instruction cache

DATA PROCESSING SYSTEMS AND METHOD FOR BATCHING TASKS OF THE SAME TYPE IN AN INSTRUCTION CACHE

FIELD OF THE INVENTION

The present invention relates generally to a method for processing tasks in data processing systems and more particularly to the scheduling of tasks in such systems.

BACKGROUND OF THE INVENTION

In some computing applications, for instance the control of an I/O adapter, tasks to be processed by code executing on an adapter microprocessor are scheduled by placing the tasks onto a queue. When a task is processed, it is taken from the queue and the code for processing the task is loaded into the microprocessor, sometimes via an instruction cache (abbreviated hereinafter to i-cache). To take the example of a storage array adapter, various different tasks are defined, for example RAID 5 write and read operations, DMA hardware programming operations etc. During operation of the adapter, the different scheduled tasks are interleaved on the task queue and each task is processed in turn. Moving from one task to the next on the queue will often necessitate the execution of different code on the processor and therefore the loading of different code into the instruction cache. Such an arrangement does not provide a good i-cache hit ratio and therefore the overall performance of the system is adversely impacted.

Various techniques are known in the art for optimising cache efficiency and improving the i-cache hit ratio. The simplest technique may perhaps be to make the i-cache larger so that code for processing multiple tasks can fit into the cache. However the developer of code may not be able to make use of such a solution if the additional cost associated with a larger cache is not acceptable. Furthermore, if the i-cache is located on the microprocessor chip then its size cannot be altered. Other known techniques for improving i-cache hit ratio involve use of branch prediction, prefetching and the like.

It would be desirable to provide a technique to improve the i-cache hit ratio in a data processing system.

DISCLOSURE OF THE INVENTION

According to one aspect of the present invention there is provided a method for processing tasks in a data processing system including a microprocessor and an instruction cache and wherein tasks of different types are defined in the system, each task type having code associated therewith, the tasks being processed in order by loading the code associated with the task into the instruction cache for execution on the microprocessor, the method comprising the step of placing tasks of like type into a batch such that tasks in a batch are processed before processing the next ordered task.

Thus in a data processing system according to the present invention, outstanding tasks are sorted into batches where each batch consists of tasks which all require the same code to be executed. This arrangement is especially advantageous in the case where the code associated with a batched task fits completely within the i-cache. Each batch can then be processed in one looping operation without incurring the penalty associated with i-cache misses. Even where the code is larger than the i-cache, the invention provides some benefit in terms of i-cache hit ratio provided that the code is less than twice the size of the i-cache.

In accordance with a preferred feature of the invention, the i-cache hit ratio can be further optimised in the case where the code associated with at least one type of task is not capable of being fully loaded into the instruction cache. In this case the code is adapted such that it is logically divided into at least two portions by one or more break points defined within the code. When the code is executed by the microprocessor, a command defined at the break point causes the scheduling of a further task for future execution of the code of a second portion. The break point is defined such that the first portion of code can fit completely within the i-cache. If the second portion of code does not fit completely within the i-cache then a further break point may be defined in the code. It is convenient to define the portions such that they fall between and not within operations which must be performed atomically.

Thus the code executed on the microprocessor is effectively broken up into cache size portions to improve the i-cache hit ratio. This high-level restructuring of code is a significant departure from known methods of optimising i-cache efficiency, most of which focus at a lower level, looking at branch prediction, prefetching and the like.

Although it would be possible in some embodiments to sort the tasks after they are ready for execution, it is preferred that each task is placed in the appropriate batch at the time it is identified.

According to another aspect of the invention there is provided a computer program product comprising a computer usable medium having computer readable program code means embodied in the medium for processing tasks in a data processing system, the data processing system including a microprocessor and an instruction cache and wherein tasks of different types are defined in the system, each task type having code associated therewith, the tasks being processed in order by executing the associated code on the microprocessor, the program code means comprising code means for scheduling tasks of like type into a batch such that tasks in a batch are processed before processing the next ordered task.

According to a further aspect of the invention there is provided a data processing apparatus comprising a microprocessor and an instruction cache wherein tasks of different types are defined in the system, each task type having code associated therewith, the apparatus including: means for processing the tasks in order by loading the associated code into the instruction cache for execution on the microprocessor; and means for scheduling tasks of like type into a batch, wherein the means for processing the tasks is operable to process the tasks in a batch before processing the next ordered task.

BRIEF DESCRIPTION OF THE DRAWINGS

A preferred embodiment of the present invention will now be described with reference to the accompanying drawings in which.

DESCRIPTION OF THE PREFERRED EMBODIMENTS

Figure 1:
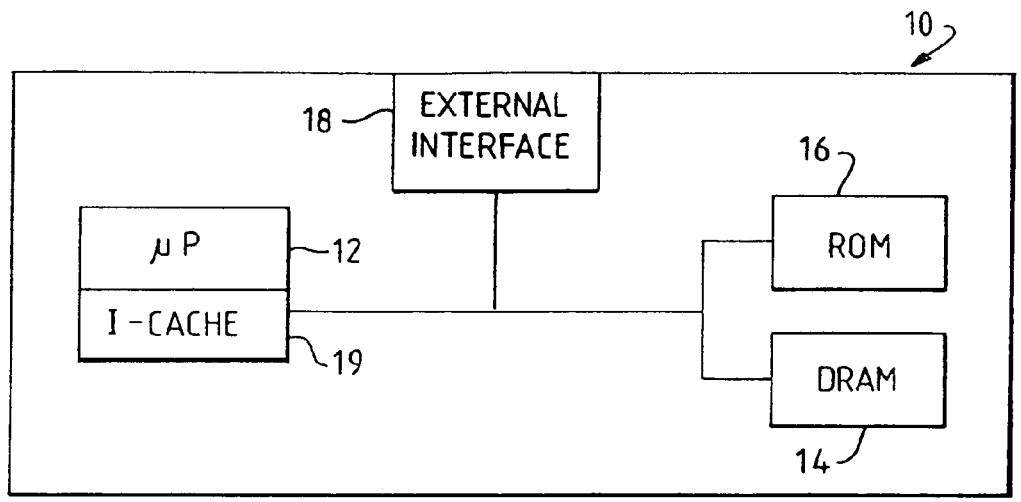
FIG. 1 is a schematic representation of a processing apparatus embodying the invention.

With reference first to FIG. 1, there is shown a processing apparatus 10 comprising a microprocessor 12 and DRAM 14 for storing data. Also provided as part of the processing apparatus is a ROM 16 in which is stored firmware that executes on the microprocessor to provide a variety of different services within the apparatus. The firmware is loaded from ROM to DRAM on initialisation of the apparatus. The processing apparatus further includes external interface logic 18 for communicating with external devices. In the case where the processing apparatus is part of a storage controller, the external interface logic is set up to communicate in a known manner with a host system and a storage subsystem.

In the present embodiment, the microprocessor includes a cache serving as an instruction cache (i-cache) 19. A typical on-chip i-cache is 16 KB in size. The cache may also serve as a data cache or there may be a separate data cache implemented in the microprocessor. The operation of the data cache is not important in the context of the present embodiment so for present purposes only the i-cache is shown. It will be appreciated that the present invention is equally applicable to systems where the i-cache is separate to the microprocessor.

In operation, the processing apparatus carries out work by scheduling tasks for processing by code executing on the microprocessor. When a task is scheduled it is placed on a queue (or alternatively a list or the like) and when it reaches the head of the queue, the code required to process the task is loaded from DRAM into the i-cache and thence to the microprocessor. Execution of the code for one type of task may result in the creation of further tasks to be added to the queue for later processing. When the task is complete, the next task in the queue is processed. If the next task is of a different type in that it requires a different portion of code, the new code is loaded into the i-cache and the task is processed. As described above, prior systems process tasks in the natural order in which they become ready for processing and this can result in poor i-cache hit ratio.

In accordance with the present embodiment, the task queue is managed in a different fashion, in that tasks of like type (i.e. tasks which require the same code path in the i-cache) are processed in batches such that if a task of a particular type already exists on the queue, then a subsequently scheduled task of the same type is grouped with the existing task instead of being placed at the tail of the queue. When the existing task reaches the head of the queue and the associated code is loaded into the i-cache, the microprocessor processes both tasks of the group using the same code before moving onto the next task in the queue.

Figure 2:
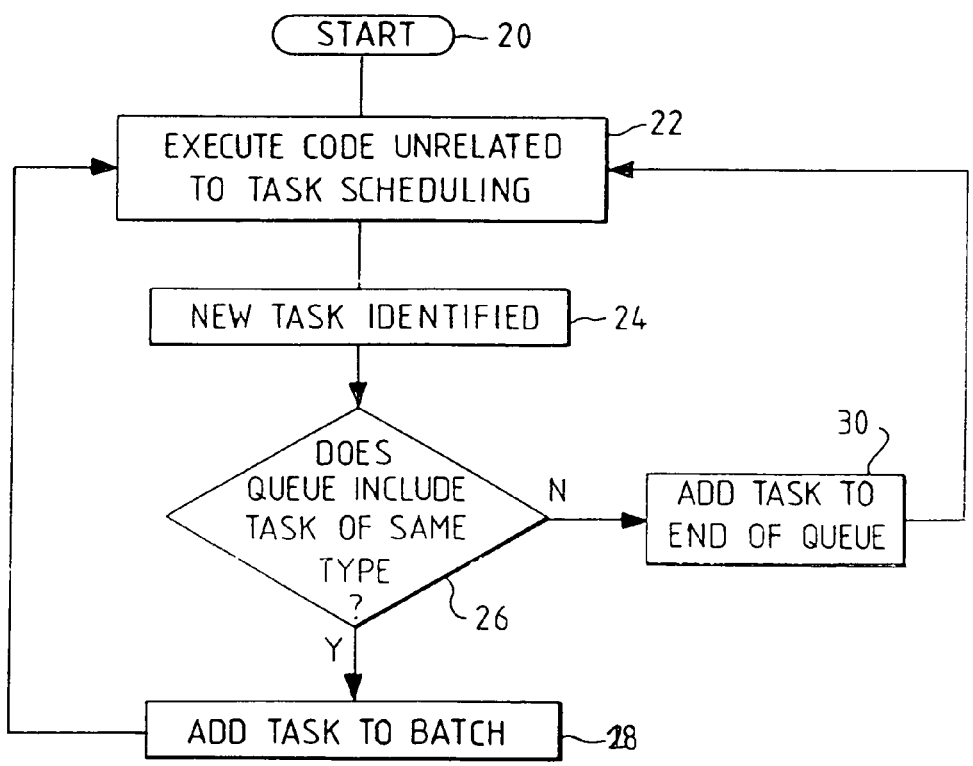
FIG. 2 is a flow diagram showing the steps involved in a task scheduling method according to a preferred embodiment of the invention.

This task scheduling process can be understood with reference to the process shown in FIG. 2 which starts at step 20. At step 22, the process is shown as waiting for a new task to be scheduled. At step 24, a new task is identified and at step 26, a determination is made as to whether the task queue already includes a task of the same type as the new task. If yes, the new task is batched with the existing task(s) at step 28. If No, the new task is added to the end of the queue at step 30.

Figure 3:
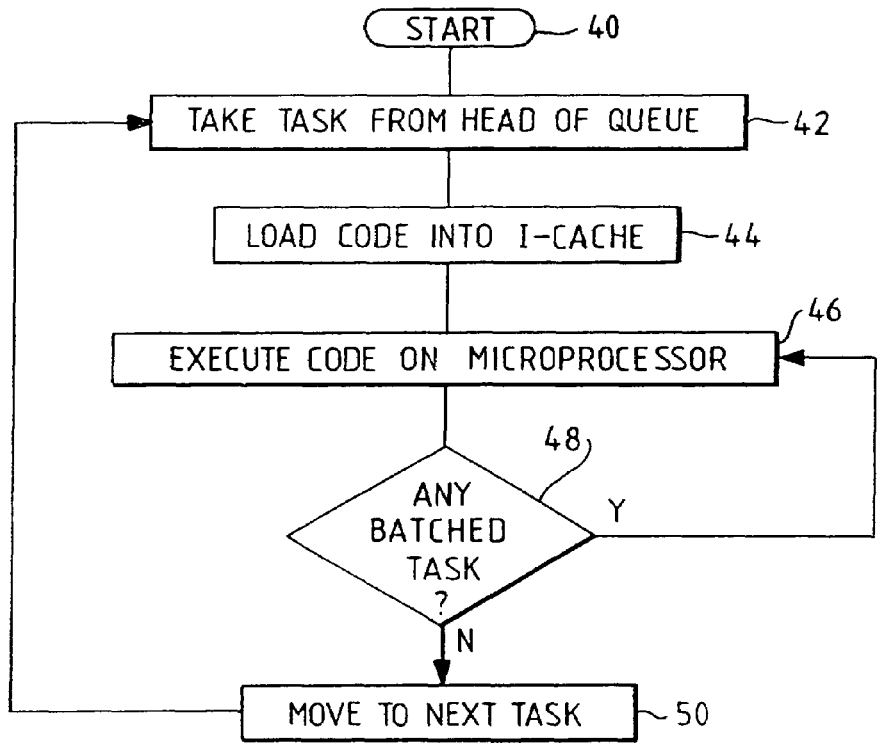
FIG. 3 is a flow diagram showing the steps involved in a task queue processing method according to a preferred embodiment of the present invention.

The processing of the task queue will now be described with reference to the process shown in FIG. 3 which starts at step 40. At step 42, assuming that queue is not empty, a task is taken from the head of the queue. At step 42, the code for processing the task is loaded line by line from the DRAM into the i-cache and executed on the microprocessor (step 46). On completion of the task, a determination is made at step 48 as to whether there is a batched task of the same type as the previously processed task. If yes, the batched task is processed by executing the code already located in the i-cache. If no, the process moves to the next task in the queue. Thus in the case where the code associated with a batched task can completely fit within the i-cache, the tasks in a batch can be processed without incurring the penalty of i-cache misses.

It will be appreciated that the present invention is applicable to the use of different batch types on the one task queue. In the case where the processing apparatus of the present embodiment is a storage controller, the different batch types might be I/O starts, I/O completions, Program DMA hardware etc.

Next will be described an enhanced feature of the present embodiment in which the i-cache hit ratio is further improved. In the foregoing description, the i-cache hit ratio is optimised when the code associated with each task can fit within the i-cache such that when subsequent tasks of a batch are processed, all the code needed for the processing is contained within the i-cache. In real applications, this may not be true for every task defined with the apparatus. Therefore in accordance with the enhanced feature, the code is adapted such that it is logically divided into portions each of which can load into the cache.

Figure 4:
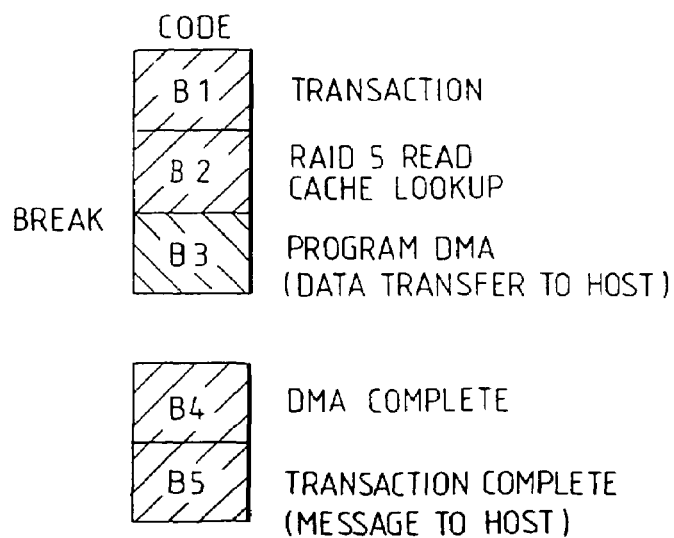
FIG. 4 is a schematic representation of the blocks of code involved in a RAID 5 read operation in the processing apparatus.

This may be understood with reference to the example of a RAID 5 read operation in the case where the processing apparatus is a storage controller. In FIG. 4 there is shown a schematic representation of the code involved in such an operation in the case where the read data requested by the host is held within a cache in the controller (no access to disk being required). In the present embodiment, the code is logically divided into five blocks each of which relates to a different process involved in the read operation.

Transaction In (B1): the host transaction is routed to the RAID 5 firmware component and some initial processing is performed to determine that the transaction parameters are valid;

RAID 5 READ cache lookup (B2): the data cache is checked for the data requested by the host;

Program DMA (B3): DMA hardware is set-up to DMA data from data cache to host system;

DMA Complete (B4): DMA hardware is reallocated for use by subsequent DMA operations;

Transaction Complete (B5): Message is sent to host to signal completion of transaction.

Assume for the sake of this example that the i-cache is capable of holding the 'DMA Complete' and 'Transaction Complete' code blocks together and is further capable of holding the 'Transaction In' and 'RAID 5 Read cache lookup' blocks together. However it is not capable of holding together the three blocks: Transaction In, RAID 5 Read cache lookup and Program DMA. By the term 'capable' is meant that the cache is both large enough to hold the code and further that there is no other reason why multiple blocks of code may not be loaded into the cache (e.g. memory clash).

In the absence of the preferred feature of the invention, when a task is scheduled for carrying out a RAID 5 read operation, the three blocks B1 to B3 will be loaded sequentially into the cache such that the block B3 code will displace at least some of the block B1 code in the cache. If there is a further RAID 5 read task in the RAID 5 read batch on the queue, the processing of the further task will result in an i-cache miss for the 'Transaction In' block of code.

To address this problem, the preferred feature provides for a logical division of the code by providing a break point between the B2 and B3 blocks. In accordance with the present embodiment, this break point takes the form of a command to schedule a task to carry out the Program DMA operation. This further task will be added to the queue. In general terms therefore, a break point is inserted into the code by the code developer to provide a logical division of the code into portions that can be held as a unit in the i-cache. The break points will be positioned to satisfy this criteria, preferably also that such that each break point falls between and not within operations which must be performed atomically. Suitable locations for break points may be devised by compiling the code associated with a task and determining whether the compiled code is capable of fitting into the cache. If not the source code can then be analysed to find a suitable break point such that the compiled code will fit within the cache. In the present example, blocks B1 and B2 form a first portion, block B3 forms a second portion and blocks B4 and B5 form a third portion.

To further aid the understanding of this enhancement, there will next be described the task scheduling process undergone in the processing apparatus during a RAID 5 read operation in the case where the requested data is already held in a data cache in the apparatus.

Figure 5:
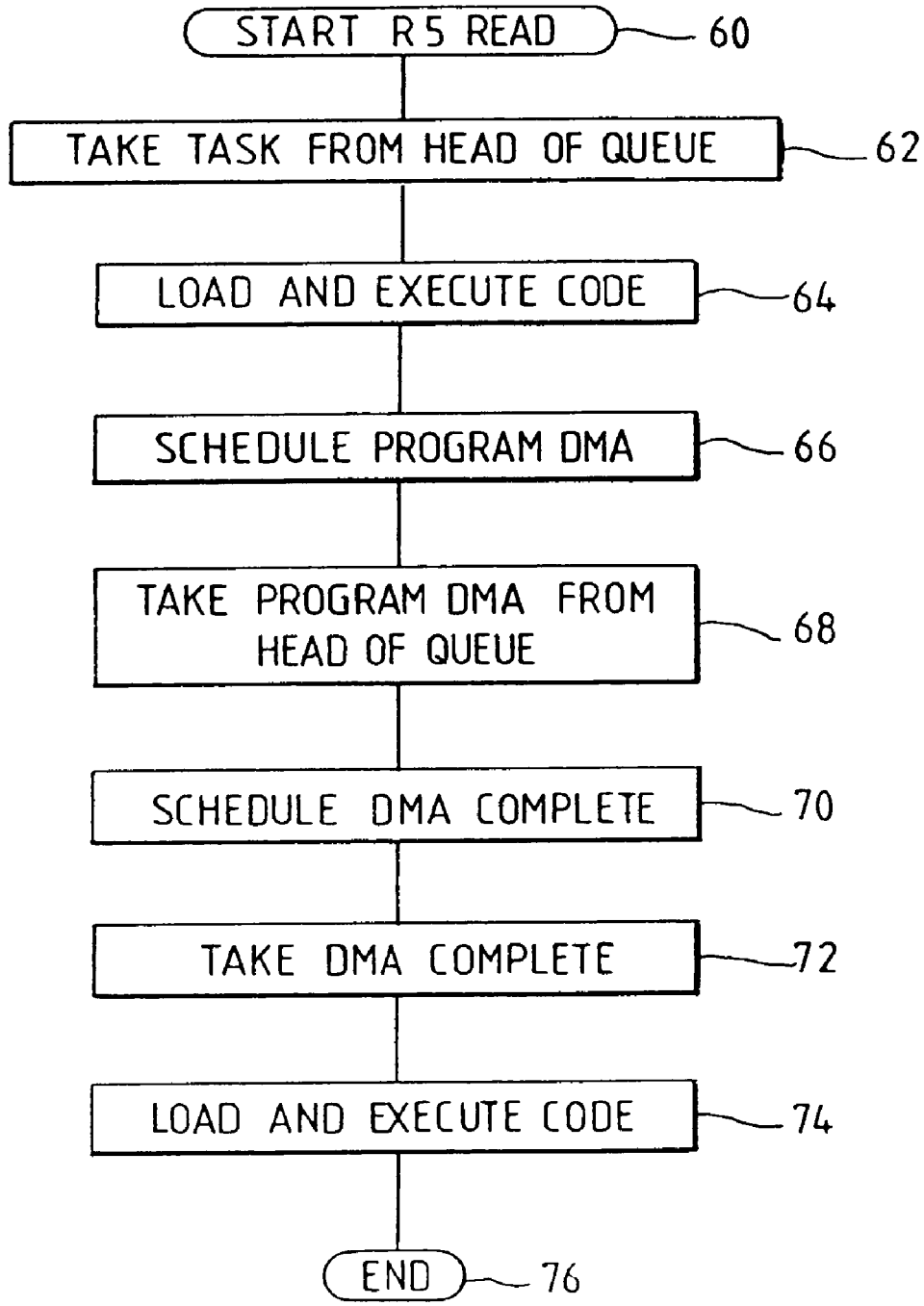
FIG. 5 is a flow diagram showing the task scheduling steps involved in a RAID 5 read operation in the processing apparatus.
Figures 6, 7, 8:
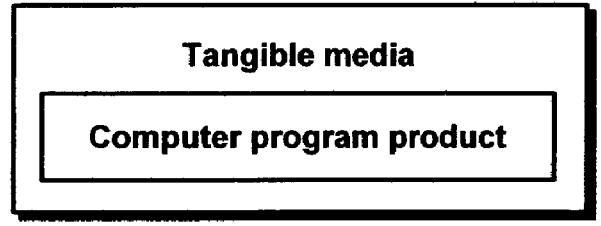
FIG. 6 shows a computer program product embodied in a tangible media.
FIG. 7 shows the operation of if the task is not capable of fully loading into the instruction cache, logically dividing the task code such that least one atomic portion of the task code will fully load in the instruction cache.
FIG. 8 shows the operation of executing the task code for processing the new task in the instruction cache without loading new code into the instruction cache.

Referring now to FIG. 5, the process starts at step 60 where the processing apparatus receives a read transaction from the host and determines that the read involves a RAID 5 read operation and schedules a task on the task queue. This task, which may for convenience be referred to as a 'RAID 5 read' task, may be added to the tail of the queue or may be batched with other like tasks in a manner described above with reference to FIG. 2.

At step 62, when the task reaches the head of the queue, it is processed and the relevant code (starting with the 'Transaction In' code) is loaded from DRAM for execution on the microprocessor (step 64). The 'Transaction In' code block completes and the 'RAID 5 Read cache lookup' block is also loaded into the i-cache. This is executed and a determination is made that the requested data is present in the data cache. In accordance with the present embodiment, on completion of this operation, a command in the 'RAID 5 read cache lookup' code causes a task to be scheduled for later execution of the 'Program DMA' operation (step 66). This task is either added to an existing 'Program DMA' batch on the queue or if no instances of this batch are on the queue, then it is added to the tail of the queue.

It should be noted that, if at this point, it is determined that there are further 'RAID 5 read' tasks in the batch, then these will be processed in a manner described above with reference to FIG. 3. As previously indicated, because the blocks B1 and B2 are already located within the cache, this further task will be processed without i-cache misses.

When the Program DMA task reaches the head of the queue, the code is loaded into the i-cache for execution by the microprocessor. On completion of this operation, a further task is scheduled at step 70, to carry out a DMA complete operation. Note that there is a natural break between 'Program DMA' and 'DMA complete' operations during which the DMA data transfer is carried out. Again, the 'DMA complete' may be added to a batch or alternatively to the tail of the queue. If there are other 'Program DMA' tasks in the batch, these are then processed as described above.

When the 'DMA complete' task reaches the head of the queue, it is processed by sequentially loading the 'DMA complete' and 'Transaction Complete' code blocks into the i-cache during execution of the code blocks by the microprocessor (step 74). When this task completes, and assuming that there are no batched 'DMA' tasks on the queue, the process ends at step 76.

While an embodiment of the invention has been described in detail above, it will be apparent to those skilled in the art that many variations and modifications can be made without departing from the scope of the invention. In particular, it will be clear that the feature of the invention whereby the code is broken-up into i-cache sized chunks may be used in environments other than the storage controller described above.

The invention claimed is:

1. A method for processing tasks in a data processing system including a microprocessor and an instruction cache wherein tasks of various types are defined in the system, each task type having code associated therewith, the tasks being processed by loading the associated code into the instruction cache for execution on the microprocessor, the method comprising:

placing tasks of same task type into a batch such that the tasks in a batch are processed before processing a next ordered task;

if the code associated with at least one type of task fits within the instruction cache, processing such a task by loading the associated code into the instruction cache and executing the code on the microprocessor, and, on a determination that there is a further task of like type in the batch, executing the loaded code to process the further task;

if the code associated with at least one type of task is not capable of being loaded as a whole into the instruction cache, logically dividing the code at one or more break points into two or more portions, and wherein during processing of such a task, responding to a break point defined within a first portion of the code to schedule a further task for future execution of a second portion of the code;

wherein the tasks of the same task type use same code in the instruction cache; and wherein the tasks are placed in the batch at the time the tasks are scheduled.

2. A method as claimed in claim 1 wherein the further scheduled task is placed in a batch of like tasks.

3. A method as claimed in claim 1 wherein each of portions of code defines an atomic operation.

4. A method as claimed in claim 1 wherein the tasks are managed as a queue.

5. A computer program product comprising a computer readable medium having computer readable program code embodied in the medium for processing tasks in a data processing system, the data processing system including a microprocessor and an instruction cache and wherein tasks of various types are defined in the system, each task type having code associated therewith, the tasks being processed by executing the associated code on the microprocessor, the program code comprising code for:

scheduling tasks of same type into a batch such that tasks in a batch are processed before processing a next ordered task, wherein the tasks of the same type use the same program code;

if the code associated with at least one type of task fits within the instruction cache, processing such a task by loading the associated code into the instruction cache and executing the code on the microprocessor, and, on a determination that there is a further task of like type in the batch, executing the loaded code to process the further task;

if the code associated with at least one type of task is not capable of being loaded as a whole into the instruction cache, logically dividing the code at one or more break points into two or more portions, and wherein during processing of such a task, responding to a break point defined within a first portion of the code to schedule a further task for future execution of a second portion of the code;

wherein the tasks of the same task type use same code in the instruction cache; and wherein the tasks are placed in the batch at the time the tasks are scheduled.

6. Data processing system comprising a microprocessor and an instruction cache wherein tasks of various types are defined in the system, each task type having code associated therewith, the system comprising:

means for processing the tasks by loading the associated code into the instruction cache for execution on the microprocessor; and if the code associated with at least one type of task fits within the instruction cache, means for processing such a task by loading the associated code into the instruction cache and executing the code on the microprocessor, and, on a determination that there is a further task of like type in the batch, executing the loaded code to process the further task;

if the code associated with at least one type of task is not capable of being loaded as a whole into the instruction cache, means for logically dividing the code at one or more break points into two or more portions, and wherein during processing of such a task, responding to a break point defined within a first portion of the code to schedule a further task for future execution of a second portion of the code;

means for scheduling tasks of same type into a batch, wherein the means for processing the tasks is operable to process the tasks in a batch before processing a next ordered task; and wherein the tasks of the same type use the same program code; and wherein the tasks are placed in the batch at the time the tasks are scheduled.

7. Data processing apparatus as claimed in claim 6 wherein the microprocessor and instruction cache are embodied on a single chip.

8. A computerized method for scheduling tasks in a task queue, the method comprising:

identifying a new task to be scheduled in the task queue;

determining if the task queue includes a cached task that requires a same code to process the cached task and the new task; and batching the new task with the cached task if the task queue includes the cached task that requires the same code to process the cached task and the new task;

if the code associated with at least one type of task fits within the instruction cache, processing such a task by loading the associated code into the instruction cache and executing the code on the microprocessor, and, on a determination that there is a further task of like type in the batch, executing the loaded code to process the further task;

if the code associated with at least one type of task is not capable of being loaded as a whole into the instruction cache, logically dividing the code at one or more break points into two or more portions, and wherein during processing of such a task, responding to a break point defined within a first portion of the code to schedule a further task for future execution of a second portion of the code; and wherein the tasks are placed in the batch at the time the tasks are scheduled.

9. The method of claim 8, further comprising adding the new task to the end of the queue if the task queue does not include the cached task that requires the same code to process the cached task as the new task.

10. The method of claim 8, further comprising:

loading task code for processing the cached task into an instruction cache;

executing the task code for processing the cached task in the instruction cache; and executing the task code for processing the new task in the instruction cache without loading new code into the instruction cache.

11. A computer program product embodied in a tangible computer readable media for processing tasks in a data processing system comprising:

program codes for scheduling tasks in a task queue, the program codes comprising codes to:

identify a new task to be scheduled in the task queue;

determine if the task queue includes a cached task that requires the same code to process the cached task and the new task;

batch the new task with the cached task if the task queue includes the cached task that requires the same code to process the cached task and the new task;

if the code associated with at least one type of task fits within the instruction cache, process such a task by loading the associated code into the instruction cache and execute the code on the microprocessor, and, on a determination that there is a further task of like type in the batch, execute the loaded code to process the further task;

if the code associated with at least one type of task is not capable of being loaded as a whole into the instruction cache, logically dividing the code at one or more break points into two or more portions, and wherein during processing of such a task, respond to a break point defined within a first portion of the code to schedule a further task for future execution of a second portion of the code; and wherein the tasks are placed in the batch at the time the tasks are scheduled.

12. The computer program product of claim 11, wherein the program code is further configured to add the new task to the end of the queue if the task queue does not include the cached task that requires the same code to process the cached task as the new task.

13. The computer program product of claim 11, wherein the program code is further configured to:
    load task code for processing the cached task into an instruction cache;
    execute the task code for processing the cached task in the instruction cache; and
    execute the task code for processing the new task in the instruction cache without loading new code into the instruction cache.

\* \* \* \* \*